Jan. 16, 1934.　　　V. D. HENNESSEY　　　1,943,865
MIXING VALVE
Filed April 2, 1928　　　4 Sheets-Sheet 1

INVENTOR.
Vincent D. Hennessey
BY
R. S. Caldwell
ATTORNEY.

Jan. 16, 1934.  V. D. HENNESSEY  1,943,865
MIXING VALVE
Filed April 2, 1928  4 Sheets-Sheet 2

INVENTOR.
Vincent D. Hennessey
BY R. S. C. Caldwell
ATTORNEY.

Jan. 16, 1934.　　　V. D. HENNESSEY　　　1,943,865
MIXING VALVE
Filed April 2, 1928　　　4 Sheets-Sheet 3
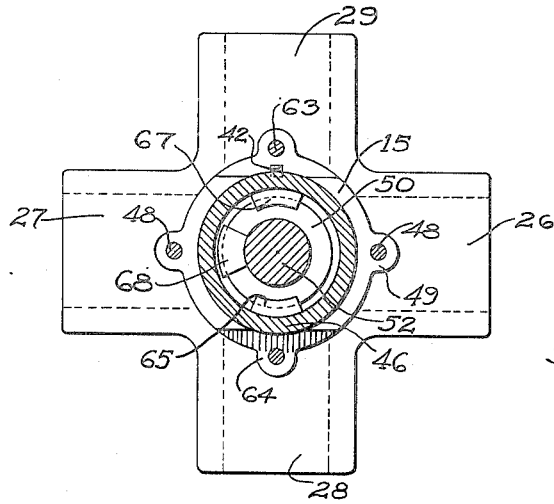
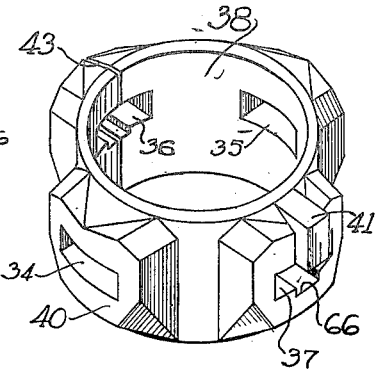
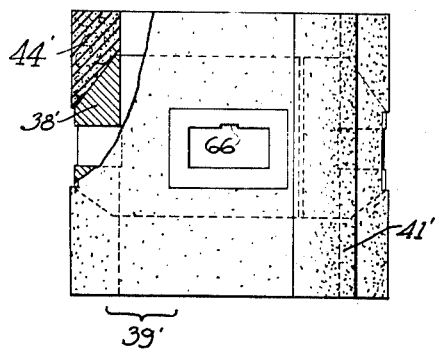
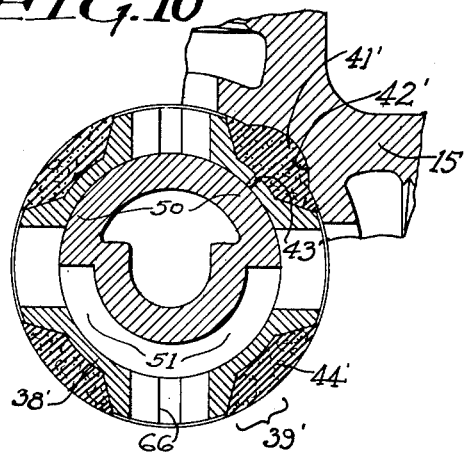
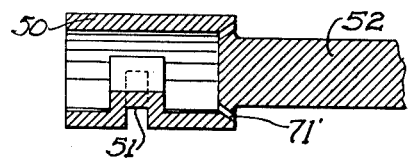
WITNESSES.
Irving J. Rose.
L. Kilian
INVENTOR.
Vincent D. Hennessey
By R. S. Caldwell
ATTORNEY.

Jan. 16, 1934.  V. D. HENNESSEY  1,943,865
MIXING VALVE
Filed April 2, 1928  4 Sheets-Sheet 4
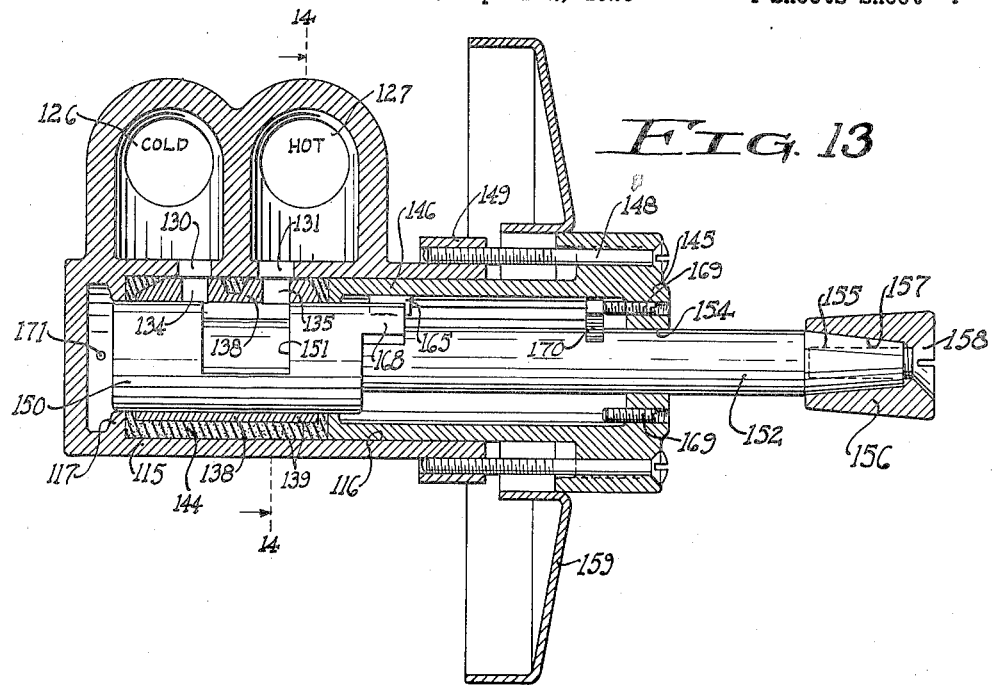
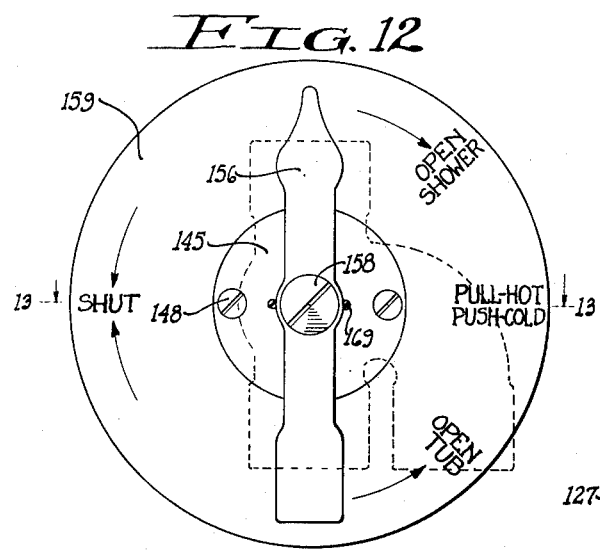
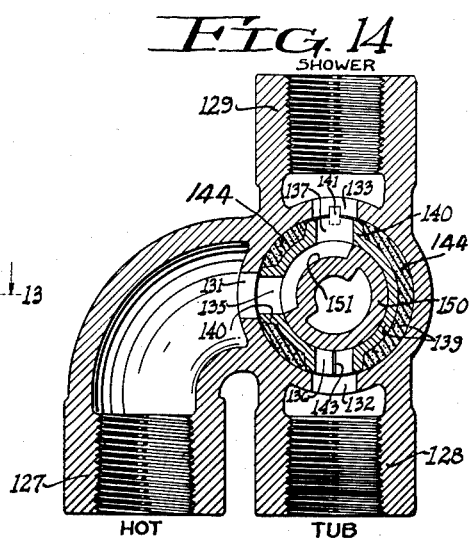

Patented Jan. 16, 1934

1,943,865

UNITED STATES PATENT OFFICE 1,943,865

MIXING VALVE

Vincent D. Hennessey, Milwaukee, Wis.

Application April 2, 1928. Serial No. 266,547

19 Claims. (Cl. 251—4)

The invention relates to valves for commingling fluids and for controlling their discharge, and more particularly to that type of valve including a plurality of selectively effective discharge passages.

An object of the invention is to provide a valve for commingling in various proportions dissimilar fluids, such as hot and cold water, and for controlling the volume thereof and their selective discharge into a plurality of conduits, and to accomplish such purpose by means of a valve member of simple construction mounted for rotation and axial displacement.

Another object of the invention is to provide a valve in which such functions are accomplished by means including a rotary and axially displaceable valve member requiring only a single port or transfer passage.

A further object is to provide a mixing valve including a packing member ported for the passage of fluid, and a related object is to provide such packing member with a plurality of ports.

A further object is to provide a valve construction wherein liquid pressure acts on the packing member for effecting a liquid-tight seal.

A further object is to provide a mixing valve including a valve cover for guiding a valve member and also forming a gland for retaining and compressing a packing member within which the valve member fits.

A further object is to provide a valve including simple but effective means for discharging seepage and for avoiding pressure or vacuum traps within the valve.

A further object is to provide a valve including stop means for limiting the range of movement of the valve member in its liquid passing positions and for permitting the transition of said valve member between its spaced ranges of movement only while the valve is closed.

A further object is to direct the movements of the valve member by means of abutments, the registering relation of which is controlled by the axial displacement of the valve member.

A further object of the invention is to provide a dial plate for the valve which need not be disturbed when removing and adjusting interior parts of the valve.

A further object of the invention is to provide a ported packing member which provides guidance for the valve member therewithin and which can be readily assembled into or removed from the valve.

A further object is to provide a valve in which accidental scalding is avoided by stop means adjustable without disturbing the dial.

A further object is to provide independently adjustable anti-scalding means for each discharge.

A further object is to perfect details of construction whereby the several parts of the valve may be simplified and be capable of performing several functions, and whereby assembly of the valve and replacement of parts can be readily accomplished.

The invention further consists in the several features hereinafter set forth and more particularly defined by the annexed claims.

In the accompanying drawings, Fig. 1 is a longitudinal sectional elevation through a valve embodying the invention;

Fig. 7 is a transverse sectional elevation of the valve taken on the line 7—7 of Fig. 1;

Fig. 8 is a detail perspective view of a packing member core;

Fig. 9 is a detail view of a modified form of packing member, parts being broken away and parts being shown in section;

Fig. 10 is a transverse sectional view through the packing member of Fig. 9, a fragmentary part of the valve body being associated therewith;

Fig. 11 is a fragmentary detail sectional view of a modified form of valve member showing a different way of discharging seepage;

Fig. 12 is a front elevation of a modified form of valve;

Fig. 13 is a longitudinal sectional view thereof on a larger scale taken on the line 13—13 of Fig. 12; and Fig. 14 is a transverse sectional view of the valve taken on the line 14—14 of Fig. 13.

The invention more particularly contemplates the provision of a combination mixing valve for alternatively supplying a tub and shower with a variable flow of water at a variable temperature.

In that embodiment of the invention shown in Figs. 1 to 11, the numeral 15 designates a valve body or casing which is generally cylindrical in shape and is integrally closed at its rear end. The valve body has formed therein a longitudinal bore 16 opening at the forward end of the casing, and the rear end of the bore terminates at an inwardly-projecting annular flange 17 which forms a shoulder.

Figure 4:
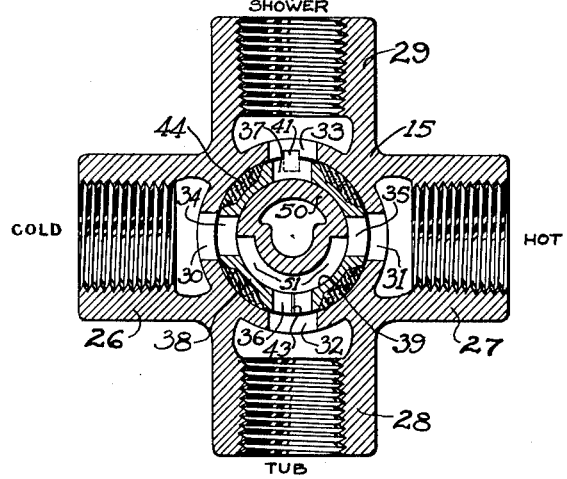
Fig. 4 is a transverse sectional view of the valve taken on the line 4—4 of Fig. 1.
Figure 6:
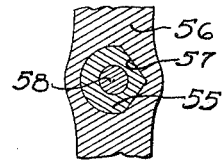
Fig. 6 is a detail sectional view of the handle mounting taken on the line 6—6 of Fig. 3.

The rear portion of the valve body has integrally formed thereon four hollow radially-extending bosses 26, 27, 28 and 29 which are internally threaded for the reception of pipes. In the present instance, the four radial pipe bosses are disposed in a common radial plane and the adjacent bosses are at right angles to each other, the bosses 26 and 27 being aligned on a horizontal axis, while the bosses 28 and 29 are aligned on a vertical axis. The bosses 26 and 27 are for the admission of cold and hot water, respectively, while the bosses 28 and 29 are for discharge to a tub and shower, respectively. Within the bosses 26 to 29 inclusive, the cylindrical portion of the hollow body is substantially uniform in thickness, as seen in Fig. 4, in order to provide uniform and prompt expansion and contraction of the valve body walls under the temperature changes. To provide communication between the interior of these pipe bosses and the interior of the valve body, there is provided in the valve body ports 30, 31, 32 and 33, which are formed within the inner ends of the bosses 26 to 29 inclusive, respectively, and are preferably rectangular in shape.

The ports 30 to 33 inclusive in the valve body register respectively, with radial ports 34, 35, 36 and 37 formed in an annular metal core 38 of a short tubular packing member 39 which fits within the bore 16 in the valve body and abuts at its rear end against the shoulder formed by the annular flange 17 near the rear end of the valve body. The valve body thus forms a stuffing box within which the packing member 39 is placed. The annular core 38 of the ported packing member 39 preferably consists of a short thin tubular portion on the outside of which are integrally formed bosses 40, within which are placed the ports 34 to 37 inclusive, heretofore noted, these ports being preferably rectangular in shape. The packing member core 38 may conveniently be of die cast construction and is provided at one boss with a key projection 41 which enters a keyway 42 formed longitudinally within the bore 16 of the valve body to properly dispose and maintain the ports in the core with respect to the ports 30 to 33, inclusive, formed in the valve body. The core 38 is provided with a slot 43 preferably extending through one of the bosses 40 opposite the key projection 41, the slot 43 serving to impart a certain degree of peripheral elasticity to the packing member core.

To form the tubular packing member 39, the tubular core 38 has molded thereabout under compression a slightly plastic packing material 44, such as a babbitt-graphite compound, which extends beyond the ends of the core and fills the interstices between the bosses 40 on the core so as to present a cylindrical exterior and interior. The packing material 44 preferably extends slightly beyond the bosses 40, so that the outer ends of each of the ports 34 to 37, inclusive, in the core are entirely surrounded by the packing material to permit expansion and contraction of the ported bosses and to effect the engagement of the packing material with the walls of the bore 16 for preventing escape of water along the bore. The plastic packing material is formed of shavings, trimmings, or spatterings of metal, preferably of some soft metal such as babbitt, and these metal particles when molded under compression are interlaced and bound together so as to form a relatively firm solid mass which may be handled without danger of crumbling. This molded plastic mass also includes a suitable lubricant, such as graphite, to minimize wear and to permit manipulation of a valve member mounted within the packing member, as hereinafter described, without offering undue resistance to its movements. The lubricant should be of such character that it will not congeal or be washed out by the flow of liquid through the valve.

The formation of the ported bosses 40 of the packing member core avoids the possibility of particles of the plastic packing material escaping into the registering ports formed in the valve body, and the thicker portion of the core around the ports is formed at various angles, as seen in Fig. 8, in order that the longitudinal compression of the packing member will contract the core in diameter and also to permit the plastic packing material to become well set in place and deposit lubricant on a contiguous valve member, hereinafter described. The extension of the plastic packing material beyond the ends of the tubular core serves to seal the longitudinal slot in the core, and to prevent escape of water beyond the packing.

In the modified form of packing member 39' shown in Figs. 9 and 10, the packing material 44' molded about the core 38' has a longitudinal ridge 41' formed thereon entering a longitudinal groove 42' in the valve body 15 to properly dispose and maintain the packing member within the valve body. The ridge 41' thus serves the same purpose as the key-projection 41 formed in the packing member core 38 shown in Fig. 8. In the modified form of packing member, the longitudinal slot 43' in the core 38' may be formed in the thin portion of the core rather than through the ported boss as indicated in Fig. 8.

A cup-like valve cover 45 is provided with an integral sleeve or tubular portion 46 which fits within the bore 16 formed in the valve body, the cover being held against relative rotation with respect to the valve body by means of a key 47 retained in the tubular portion 46 and entering the keyway 42 in the valve body. The enlarged cylindrical forward end of the valve cover 45 projects beyond the valve body and has passed therethrough a pair of long screws 48, the rear portions of which enter diametrically opposite tapped lugs 49 formed on the valve body, thereby retaining the valve cover on the valve body against axial withdrawal. The rear end of the sleeve or tubular portion 46 of the valve cover is inwardly flanged and bears against the forward end of the tubular packing member 39 to not only retain the latter against axial displacement but to place it under compression, this being accomplished by urging the gland-forming valve cover 45 into the valve body by means of the screws 48. The portions of the plastic packing material 44 extending axially beyond the ends of the core 38 permit compression of the packing material by gland take-up.

Within the tubular ported packing member 39 is slidably and rotatably mounted a cylindrical valve member or piston 50, which is provided with a peripheral semi-cylindrical slot-like transfer port or passage 51 adapted for registration with the ports 34 to 37, inclusive, in the packing member 39. The valve member or piston 50 is secured at the rear end of a coaxial valve stem 52, which slidably and rotatably fits within a bore 54 formed in the forward end of the valve cover 45, and the forward portion of the valve stem projecting from the cover is provided with a tapered and laterally flatted end 55 on which is mounted a handle 56. An intermediate portion of the handle 56 is provided with a tapered interiorly flatted bore 57 receiving the tapered flatted end 55 of the valve stem to insure the correct relative position of the handle on the valve stem 52 and to prevent relative rotation of the handle with respect to the valve stem, and the handle is secured in place on the stem by means of a screw 58 passing centrally into the end of the valve stem.

Figure 1:
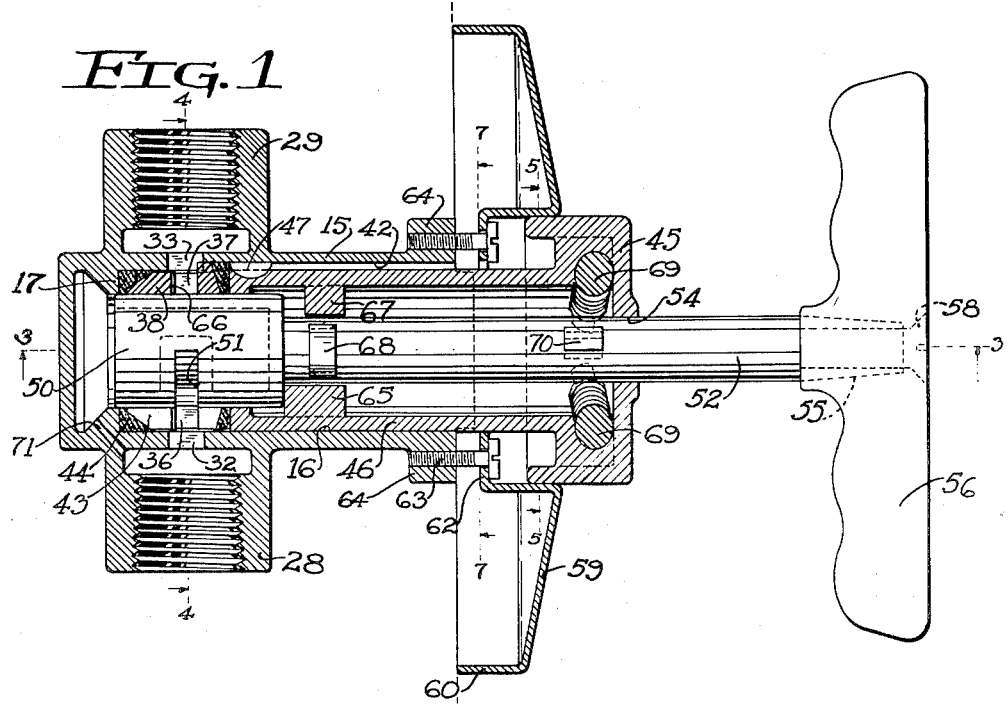
Figure 2:
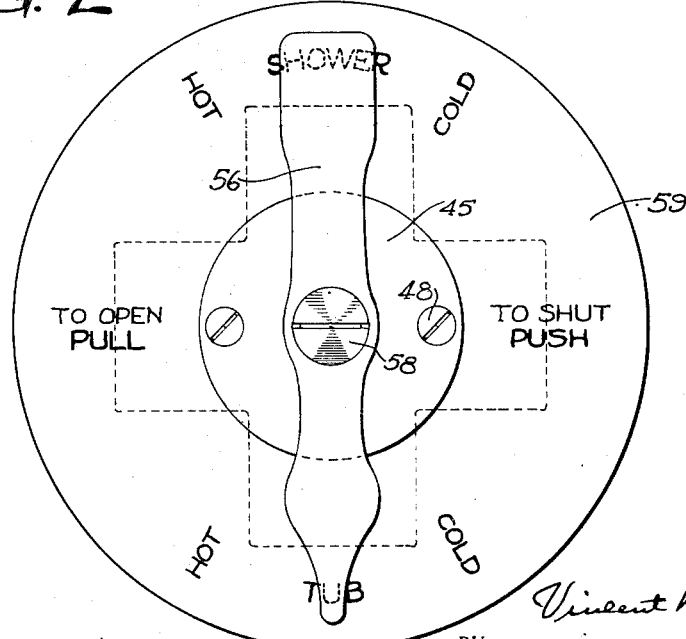
Fig. 2 is a front elevation thereof.
Figure 3:
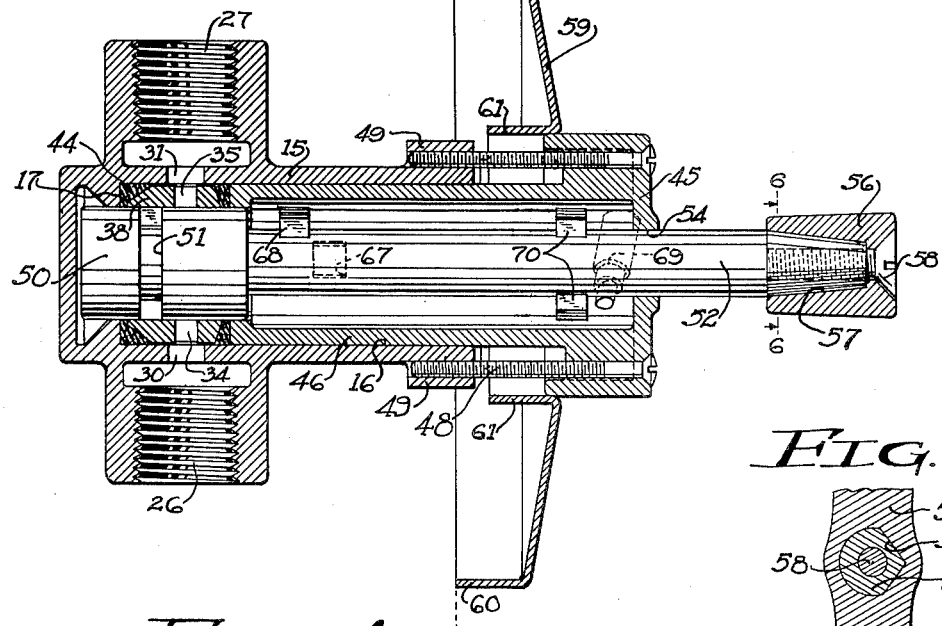
Fig. 3 is a longitudinal sectional view of the valve taken on the line 3—3 of Fig. 1.

The valve cover 45 is surrounded by an annular dial plate 59, which may conveniently be of porcelain enamelled sheet metal. The peripheral portions of the dial plate 59 includes a cylindrical flange 60, the rear edge of which is adapted to bear against a wall within which the valve is mounted, and the inner portions of the dial plate adjacent the cover includes a similar rearwardly projecting cylindrical flange 61 within which slidably fits the enlarged cylindrical forward portion of the cover 45. By means of the relative independent axial displacement permitted between the cover and the dial plate, a degree of latitude is afforded accommodating variations in the position of the wall surface with respect to the valve body, and the packing member 39 may be compressed by forcing the valve cover 46 into the valve body 15 by the screws 48. By means of the cup-like depression in the center of the dial plate, the valve cover may be readily removed from the valve body, or projected therein, without disturbing the dial plate. The rearward edge of the flange 61 of the dial plate is provided with inwardly projecting segmental flanges 62 disposed in diametrically opposite relation and apertured to receive attaching screws 63, which are threaded into diametrically opposite lugs 64 formed on the valve body. The forward faces of the lugs 64 are preferably disposed in the plane of the wall within which the valve is mounted, while the lugs 49 receiving the gland screws 48 may project forwardly of the wall line, as seen in Fig. 3. The dial plate has placed thereon suitable indicia for directing the movement of the handle 56, which latter is preferably arrow-shaped to indicate the selective discharge of the valve and the water temperature, and is preferably transversely corrugated on its rear edge as seen in Fig. 1 to fit the fingers of the hand.

The valve member or piston 50 is movable by means of its handle both axially and rotatably, the transfer port or passage 51 in the valve member being out of register with the packing member ports when the valve member is in rearward position and placed in register with certain of the ports when the valve member is in forward position. The valve member 50 is guided in position and held in alignment by its fit within the rearward annularly flanged end of the valve cover sleeve 46 and the annular flange 17 and also by the fit of the valve stem 52 in the apertured forward end of the valve cover 45. The packing member core 38 also aids to keep the valve member in alignment. When the tubular packing member 39 is longitudinally compressed by means of the gland-forming valve cover, it is contracted about the valve member or piston 50 to form a liquid-tight fit, the thin walls of the core 38 insuring uniform contraction of the core against the valve member. The ports 30 to 33 inclusive in the valve body are each preferably larger than the respective registering ports 34 to 37 inclusive in the packing member 39, as seen in Figs. 1 and 3, in order to avoid reduction in port area when the packing member 39 is compressed and to provide a surface against which the incoming liquid under pressure urges the packing member core 38 against the valve member 50 to prevent escape of liquid along the periphery of the valve member.

In the extreme axial positions of the valve member, the transfer port or passage 51, preferably, though not necessarily, remains within the tubular metallic core 38 of the packing member, to prevent the packing material 44 at the ends of the core from accidentally entering the transfer port. The distance between the rearward edge of the core 38 and the inlet ports 34 and 35 is greater than the width of the transfer passage 51 in the valve member to prevent water under pressure from passing over the plastic material 44 and escaping while the valve is being closed. The liquid under pressure in the intake ports 30 and 31 of the valve body presses inwardly on the outer faces of the bosses 40 and thereby urges the packing member core 38 against the valve member or piston 50 for preventing the escape of liquid along the periphery of the piston. The clearance between the outer surface of the core 38 and the bore 16 in the valve body permits expansion of the core under heat without danger of binding.

The valve member or piston 50 is limited in its rearward axial movement by its abutment with the rear end of the valve body, and the forward movement is limited by the engagement of the valve member with the rear end of a lug 65 integrally formed within the sleeve 46 of the valve cover, or, if desired, by the engagement of the lug 70 with the interior front portion of the valve cover. In the forward position of the valve member, the transfer port 51 in the valve member registers in such manner with the ports in the packing member that the maximum discharge of liquid is obtained. The semi-cylindrical transfer port 51 registers with one or the other of the discharge ports 36 and 37 in the packing member and with both or either of the inlet ports 34 and 35, the angular displacement of the valve member determining the variable flow of liquid through the inlet ports 34 and 35, while the axial displacement of the valve member determines the variable volume of discharge. The discharge ports 36 and 37 preferably each include a portion extending rearwardly beyond the most rearward face of the inlet ports 34 and 35, in order that the discharge ports will close slightly after the inlet ports, thus avoiding any trapping of water under pressure within the transfer port 51. This rearwardly extended portion of each discharge port may be in the form of a notch 66, as best seen in Fig. 8. The valve member is sufficiently long so that in all positions it bears against the front and rear parts of packing material 44.

The sleeve 46 of the valve cover has integrally formed therein a lug 67 disposed diametrically opposite to the lug 65 but preferably not extending so far rearwardly as the latter lug. A lug 68 formed on the valve stem co-operates with the lugs 65 and 67 on the stationary sleeve 46 to limit the maximum angular displacement of the valve stem and its attached valve member 50. When the valve member is pulled forwardly to liquid-discharging position, the lug 68 on the valve stem lies in the same plane as both lugs 65 and 67, so that the maximum angular displacement of the valve member determines the extreme "hot" and "cold" positions for the selected discharge. In this manner, when the valve member is in discharging position, it would be impossible to effect the transition from "tub" to "shower" discharge. When the valve member is displaced rearwardly to closed position, the lug 68 on the valve stem is clear of the lug 67, so that a more extended rotation of the valve member is possible to permit the change from a "tub" discharge to a "shower" discharge, or vice versa. However, the lug 68 on the valve stem still registers with the longer lug 65 in the valve cover so that the valve member is constrained to reach its two spaced ranges of movement only by way of the "cold" ends thereof. If the lug 65 is shortened to extend rearwardly no farther than the rear face of the lug 67, the transition from "tub" to "shower" or vice versa, may be accomplished by rotating the valve member in either direction.

In the closed position of the valve member 50 the transfer passage 51 in the valve member is out of register with both intake ports 34 and 35 and both discharge ports 36 and 37. The peripheral surface of the valve member then closes and seals all the ports and prevents passage of liquid between the intake ports. This obviates the use of check valves in the supply pipes when the liquid in the pipes may be at different pressures.
The position of the discharge ports between the intake ports further aids to prevent the passage of liquid between the intake ports.

Figure 5:
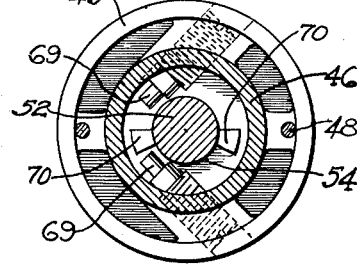
Fig. 5 is another transverse sectional view taken on the line 5—5 of Fig. 1.

In order to limit the temperature of the hot water issuing from either discharge, two stop screws 69 are threaded into the forward portion of the valve cover 45, as best seen in Figs. 1 and 5, to co-operate with one or the other of a pair of opposite lugs 70 formed on the valve stem. By adjusting these screws in or out, the maximum temperature of the discharging hot water to "tub" or "shower" may be independently varied, according to requirements, by preventing a complete closure of the cold water inlet port, thereby avoiding accidental scalding. This adjustment may also be used to facilitate the tempering of the bath water to the desired degree, since the valve in maximum "hot" position can directly provide water of the proper temperature. The lugs 70 register with the stop screws 69 only when the valve is in discharging position and clear the stop screws entirely when the valve is in closed position.

In order to avoid trapping of air or seepage behind the valve member 50, which would interfere with the operation of the valve, a relief passage 71 is formed in the valve body connecting the space behind the piston with the "tub" discharge pipe boss 28, so that any small amount of air or seepage entering behind the valve member will find its way into the discharge conduit to the tub. This relief passage also prevents the formation of a vacuum behind the valve member. In the modified form of invention, shown in Fig. 11, a relief passage 71' is formed within the valve member and discharges any seepage into the interior of the sleeve 46 of the valve cover whence it would find its way out through the front portion of the cover. The lower segmental flange 62 on the dial plate would then form a dam preventing any water from entering into the wall within which the valve is mounted.

In that embodiment of the invention shown in Figs. 12 to 14, the controlling movements of the valve member are interchanged with respect to those in the first described embodiment; namely, the axial movement of the valve member controls the proportions of the commingling fluids while the rotary movement controls the volume of discharge. In the modified form of valve 115 designates the valve body or casing which is generally cylindrical in shape and is integrally closed at its rear end. The valve body has formed therein a longitudinal bore 116 opening at the forward end of the casing, and the rear end of the bore terminates at an inwardly projecting annular flange 117 which forms a shoulder.

The rear portion of the valve body has formed therein four hollow bosses 126, 127, 128 and 129, which are internally threaded for the reception of pipes. In the present instance, the bosses 128 and 129, which are for discharge to a tub and shower, respectively, are aligned on a vertical axis, while the bosses 126 and 127, which are for the admission of cold and hot water, respectively, are disposed in laterally adjacent relation at one side of the valve body, as seen in Fig. 13, the boss 126 being disposed rearwardly of the boss 127. In this manner, the inlet pipes and the tub discharge pipe may extend vertically into connection with the valve from below, while the shower discharge pipe extends vertically into connection with the valve from above. To provide communication between the interior of these pipe bosses and the interior of the valve body, there are provided in the valve body ports 130, 131, 132 and 133 which are formed within the inner ends of the bosses 126 to 129 inclusive, respectively, and are preferably rectangular in shape.

The ports 130 to 133 inclusive in the valve body register, respectively, with radial ports 134, 135, 136 and 137 formed in an annular metallic core 138 of a tubular packing member 139 which fits within the bore 116 in the valve body and abuts at its rear end against the shoulder formed by the annular flange 117 near the rear end of the valve body. The valve body thus forms a stuffing box within which the packing member 139 is placed. The packing member 139 is generally similar to the packing member 39 and consists of a thin tubular portion on the outside of which are formed bosses 140 wi hin which are placed the ports 134 to 137 inclusive, heretofore noted, these ports being preferably rectangular in shape. The packing member core may conveniently be of die cast construction and is provided at one boss with a key projection 141 which enters a keyway formed longitudinally within the valve body to properly dispose and maintain the ports in the core with respect to the ports in the valve body. The core 138 is provided with a slot 143 which preferably extends through one of the bosses 140 opposite the key projection 141, and serves to impart a certain degree of peripheral elasticity to the core. The tubular core 138 has molded thereabout under compression a slightly plastic lubricant-bearing packing material 144 as in the case of the packing member 39, and this packing material extends beyond the ends of the core and fills the interstices between the bosses 140 on the core, so as to present a cylindrical exterior and interior.

A cup-like valve cover member 145 is provided with an integral sleeve or tubular portion 146 which fits wi'hin the bore 116 formed in the valve body and is held therein against relative rotation with respect to the valve body. An enlarged cylindrical forward end of the valve cover projects beyond the valve body and receives therethrough a pair of long screws 148, the rear portions of which enter diametrically opposite tapped lugs 149 formed on the valve body, thereby retaining the valve cover on the valve body against axial withdrawal. The rear end of the sleeve or tubular portion 146 of the valve cover is inwardly flanged and bears against the forward end of the tubular packing member 139 to not only retain the latter against axial displacement but to place it under compression, this being accomplished by urging the gland-forming valve cover 145 into the valve body by means of the screws 148.

Within the tubular ported packing member 149 is slidably and rotatably mounted a cylindrical valve member or piston 150 which is provided with a peripheral transfer passage or port 151 adapted for registration with the ports 134 to 137 inclusive in the packing member 139. The valve member or piston 150 is secured at the rear end of a co-axial valve stem 152 which slidably and rotatably fits within a bore 154 formed in the forward end of the valve cover 145, and the forward portion of the valve stem projecting from the cover is provided with a tapered or flatted end 155. An arrow-shaped handle 156 is provided with a tapered interiorly flatted bore 157 receiving therein the tapered flatted end 155 of the valve stem to insure the correct relative position of the handle on the valve stem and to prevent relative rotation of the handle with respect to the valve stem, and the handle is secured in place on the stem by means of a screw 158 threaded centrally into the end of the valve stem.

The valve cover 145 is surrounded by an annular dial plate 159 which may be similar in construction with the dial plate 59, heretofore described, and is provided with suitable indicia on its face, as seen in Fig. 12, for directing the movements of the handle 156.

The valve member or piston 150 is movable by means of its handle both axially and rotatably, the transfer port or passage 151 being out of register with all of the packing member ports when the valve member is in the "shut" position of Fig. 12 and placed in register with certain of the ports when the handle is rotated from the shut position. The valve member 150 is guided in position and held in alignment in the same manner as the heretofore described valve member 50, and the sealing engagement of the packing member 139 with the valve member 150 is accomplished in a manner similar to that previously described with respect to the packing member 39.

The valve member or piston 150 is limited in its rearward axial movement by its abutment with the rear of the valve body, and the forward movement is limited by the engagement of a lug 170 on the valve stem 152 with either of a pair of screws 169 threaded into the forward portion of the valve cover 145, as seen in Fig. 13. In the rearward position of the valve member 150 the transfer passage 151 is registrable with the cold water inlet port 134 while the hot water inlet port is completely closed, and in the forward position of the valve member 150, the transfer passage 151 is registrable with the hot water inlet port 135, while the cold water port 134 is either completely shut off or else left slightly open by adjusting the screws 169 which thus form antiscalding means limiting the temperature of the water entering the transfer passage. At intermediate positions of the valve member 150, different proportions of hot and cold water are admitted to the transfer passage 151, and these proportions are varied by moving the valve member inwardly or outwardly as the case may be. At the same time that the transfer passage in the valve member is in register with one or the other or both of the inlet ports, the passage is also registrable with one or the other of the discharge ports 136 and 137 and this selective control of the discharge ports is determined by the rotation of the valve member by means of its handle. In one extreme position of the valve member indicated in Fig. 14, the transfer passage is registrable with the shower discharge port in such manner as to produce the maximum volume of discharge. When a lesser volume of discharge is desired, the valve member is rotated in a clockwise direction as seen in this view (counterclockwise with respect to Fig. 12) to variably and simultaneously close the inlet ports without effecting the temperature of the discharging water. In any discharging position of the valve, the valve member may be axially displaced to vary the temperature of the discharge without changing the volume of discharge. When the valve member is rotated further in a clockwise direction, as viewed in Fig. 14, the inlet ports wil be closed, both with respect to the transfer passage and with respect to each other, but since at the point of closure the transfer passage will remain in communication with a discharge port, no trapping of water under pressure will take place in the transfer passage. As the valve member is rotated further in a clockwise direction to a point where the handle assumes a horizontal position, the shower discharge port will also be closed, and a further rotation of the valve member in the same direction will then place the transfer passage in register with the tub discharge port 136 and finally in register with the inlet ports. A lug 165 is formed on the interior of the valve cover near the valve member 150 and a co-operating lug 168 is formed on the valve member for abutment with opposite sides thereof in the maximum discharge positions of the valve. In this manner, complete rotation of the valve member is prevented and the transition movement of the valve member between its spaced operating ranges of movement must take place in the direction in which the inlet ports will remain closed. By this expedient, a complete closure of all the inlet and discharge ports is insured in the "shut" position of the valve. Since the inlet ports 130 and 131 are closed from each other in the "shut" position of the valve, no check valves are necessary in the supply lines to prevent flow of water from one line into the other in case a difference of pressure exists between the supply lines. The lug 165 may also be employed as an abutment engageable by the forward edge of the valve member to determine the extreme forward position of the valve member when the screws 169 are screwed outwardly, but, if desired, the abutment of the lug 170 with the forward portion of the valve cover may be used to limit such movement. The two adjusting screws 169 which co-operate with the lug 170 on the valve stem 152 serve to limit the temperature of the discharging water in the tub and shower discharge positions, respectively, and this adjustment may be thus made independently for each discharge.

In order to avoid trapping of air or seepage behind the valve member 150, or the establishment of a vacuum at this point, all of which would interfere with the operation of the valve, a relief passage 171 is formed in the valve body to connect the space behind the piston with the tub discharge boss 128, so that any small amount of air or seepage entering behind the valve member will find its way to the tub.

The invention provides a mixing valve of simple, durable and relatively inexpensive construction well suited for its intended purpose and capable of convenient assembly and ready replacement of parts. The simplicity of the valve is largely attained by so constructing the various parts that they perform a multiplicity of functions; thus, for instance, the valve cover not only acts as such but provides widely spaced bearings for accurately aligning the valve member, retains the packing member in position, acts as a gland for longitudinally compressing the valve member, includes a part forming a stop limiting the forward displacement of the valve member, and includes various abutments for directing the various movements of the valve member. The packing member not only serves as such, but includes ports for controlling the passage of fluid, and permits simplification of the movable valve member, since the latter need only be provided with a single transfer port or passage to control the selective discharge, to variably proportion the hot and cold water, and to control a variable volume of discharge.

What I claim as new and desire to secure by Letters Patent is:

1. In a valve, the combination of a hollow body having a cylindrical interior from which extend a plurality of fluid-receiving inlet ports and a plurality of fluid-receiving discharge ports, and a piston movable within said cylindrical interior for independent rotation and axial displacement and having a single peripheral transfer passage registrable with said inlet ports and a selected discharge port, one of said movements of said piston effecting variable closure of said inlet ports to provide variable proportions of the fluids entering said transfer passage and the other of said movements of said piston effecting variable closure of the ports to control the volume of discharged fluid.

2. In a valve, the combination of a valve casing having a plurality of fluid passages therein, a packing member disposed within said valve casing and having inlet and discharge ports formed therein to extend from a cylindrical interior and communicating with respective fluid passages in said valve casing, and a valve member movably fitting within said cylindrical interior and having a recess registrable with said inlet and discharge ports and registrable to a variable extent with said inlet ports to provide variable proportions of the fluids entering said recess.

3. In a valve, the combination of a fluid-receiving valve body, a valve member movable relatively thereto, and an annular packing member interposed between said valve body and valve member in engagement therewith and having a port extending between its outer and inner peripheries and providing communication between said valve body and valve member, said packing member forming a seal around said port.

4. In a valve, the combination, with a fluid-receiving casing and a movable valve member therein, of an annular contractible packing member mounted in said valve casing and surrounding said valve member and having a port providing communication between said valve casing and valve member, and means for compressing said packing member to contract interior portions thereof into sealing engagement with said valve member, said packing member forming a seal around said port.

5. In a valve, the combination of a hollow body having a cylindrical interior from which extend fluid-receiving inlet and discharge ports, and a piston movably fitting within said cylindrical interior for rotation and axial displacement and having a transfer passage registrable with said inlet and discharge ports to provide discharge of fluids in variable proportions, the displacement of said piston effecting variable closure of said ports and said piston in its valve-closing movement having its transfer passage in communication with said discharge port after the closing of said inlet ports whereby to prevent trapping of water under pressure in said transfer passage.

6. In a valve, the combination of a casing and a packing member disposed within said casing and having a port, said casing and packing member having interengaging parts preventing relative rotation of said packing member with respect to said casing to maintain the port in a predetermined angular position with respect to the casing.

7. A packing member for valves comprising an annular core having a radial port therein for the flow of fluid therethrough, and packing material molded on said core and surrounding the outer end of said port to seal said port.

8. A packing member for valves, comprising a contractible relatively firm annular core including an inclined face, and packing material molded about said core in engagement with said inclined face and being capable of compression in an axial direction with respect to said core whereby the pressure of the packing material on said inclined face will contract the core.

9. A packing member for valves, comprising a relatively firm contractible annular core, and a slightly plastic packing material molded about said core.

10. In a valve, the combination of a hollow body having a cylindrical interior from which extend inlet and discharge ports, a valve member movably fitting within said cylindrical interior to control said inlet and discharge ports, a valve cover guiding said valve member therethrough and having an enlarged head portion extending beyond said hollow body and a tubular portion within said cylindrical interior, means for securing the enlarged head portion of the valve cover to said hollow body, an operating handle mounted on the outer end portion of said valve members beyond said cover, and a dial plate secured to said hollow body and surrounding the head portion of said valve cover to permit independent placement and removal of said cover.

11. In a valve, the combination of a hollow body having a cylindrical interior from which extend inlet and discharge ports, a valve member movably fitting within said cylindrical interior to control said inlet and discharge ports, a valve cover guiding said valve member therethrough and having an enlarged head portion extending beyond said hollow body and a tubular portion within said cylindrical interior, means for securing the enlarged head portion of the valve cover to said hollow body, and an operating handle mounted on the outer end portion of said valve member beyond said cover, there being stop abutments on said movable valve member and on and within the tubular portion of the cover cooperating for directing and limiting the movement of said valve member.

12. In a valve, the combination of a hollow body having a cylindrical interior from which extend inlet and discharge ports, a valve member movably fitting within said cylindrical interior for controlling said inlet and discharge ports, a cover secured to said hollow body against relative rotation and having said valve member rotatably fitting therein, a stop abutment carried on said valve member, and an adjustable stop member carried by said cover and engageable with said stop abutment on the valve member for limiting the movement of said valve member and preventing complete closure of one of the said inlet ports.

13. In a valve, the combination of a hollow body open at one end and closed at the other and including a cylindrical interior from which extend inlet and discharge ports, and a piston movably fitting within said cylindrical interior for rotation and axial displacement for controlling communication between said ports, the space between the end wall of said hollow body and the adjacent end of said piston having communication with the atmosphere.

14. In a valve, the combination of a hollow body having inlet and outlet ports therein, a valve member movable within said hollow body and registrable with a selected discharge port and variably registrable with said inlet ports for controlling the proportions of discharging fluid, and independent means for variably limiting the complete closure of one of said inlet ports in the selective discharging positions of the valve.

15. In a valve, the combination of a hollow body having a cylindrical interior from which extend inlet ports spaced axially with respect to said cylindrical interior and a discharge port spaced peripherally from said inlet ports, a valve member movably fitting within said cylindrical interior for independent rotation and axial displacement and having a recess registrable with said ports, the axial movement of said valve member effecting the variable closure of said inlet ports to vary the proportions of fluids entering said recess and the rotation of said valve member effecting the closure of said inlet ports to control the volume of discharging fluid, and common operating means for effecting the independent rotation and axial displacement of said valve member.

16. In a valve, the combination of a hollow body having inlet ports and discharge ports, valve means movably mounted within said hollow body for rotation and axial displacement to control communication between said inlet ports and a selected discharge port, common operating means for effecting the rotation and axial displacement of said valve means, and means for insuring the closure of said inlet ports during the discharge-selecting movement of said valve means.

17. In a valve, the combination, with a valve body and movable valve member therein, of an annular packing member interposed in sealing engagement between said valve body and valve member and having a core carrying packing material thereon, said core being slotted to permit the contraction of said packing member about said valve member.

18. A packing member for valves comprising a core having a boss thereon provided with a port therethrough, and packing material molded about said core and surrounding said boss to form a seal about said port.

19. A packing member for valves comprising a core having a port therethrough and having packing material molded thereon, said packing material surrounding said port to form a seal therefor.

VINCENT D. HENNESSEY.